(12) United States Patent
Fischer et al.

(10) Patent No.: US 12,476,304 B2
(45) Date of Patent: Nov. 18, 2025

(54) HIGH-VOLTAGE BATTERY COMPRISING A TEMPERATURE CONTROL DEVICE, AND VEHICLE

(71) Applicant: Bayerische Motoren Werke Aktiengesellschaft, Munich (DE)

(72) Inventors: Uwe Fischer, Munich (DE); Erwin Weigl, Buchloe (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 939 days.

(21) Appl. No.: 17/285,768

(22) PCT Filed: Oct. 23, 2019

(86) PCT No.: PCT/EP2019/078832
§ 371 (c)(1),
(2) Date: Apr. 15, 2021

(87) PCT Pub. No.: WO2020/108877
PCT Pub. Date: Jun. 4, 2020

(65) Prior Publication Data
US 2021/0391610 A1    Dec. 16, 2021

(30) Foreign Application Priority Data
Nov. 29, 2018   (DE) .................... 10 2018 130 335.1

(51) Int. Cl.
*H01M 10/656* (2014.01)
*B60L 50/64* (2019.01)
(Continued)

(52) U.S. Cl.
CPC ......... *H01M 10/6557* (2015.04); *B60L 50/64* (2019.02); *H01M 10/625* (2015.04);
(Continued)

(58) Field of Classification Search
None
See application file for complete search history.

(56) References Cited

U.S. PATENT DOCUMENTS

| 2005/0202311 A1 | 9/2005 | Higashino et al. |
| 2008/0233470 A1* | 9/2008 | Zhu .................... F28D 15/0266 165/104.28 |
| 2013/0022855 A1 | 1/2013 | Hsiao et al. |

(Continued)

FOREIGN PATENT DOCUMENTS

| CN | 1667851 A | 9/2005 |
| CN | 201777110 U | 3/2011 |

(Continued)

OTHER PUBLICATIONS

International Search Report (PCT/ISA/210) issued in PCT Application No. PCT/EP2019/078832 dated Feb. 12, 2020 with English translation (six (6) pages).

(Continued)

*Primary Examiner* — Yoshitoshi Takeuchi
(74) *Attorney, Agent, or Firm* — Crowell & Moring LLP (57) ABSTRACT

A high-voltage battery for an electrically drivable vehicle has a plurality of battery cells and at least two temperature control plates for controlling the temperature of the battery cells. The high-voltage battery has a sandwich structure with at least one layer stack, wherein a temperature control plate layer consisting in each case of a temperature control plate and a battery cell layer consisting in each case of at least two battery cells are alternately stacked on top of one another in a stacking direction. The temperature control plate of a temperature control plate layer is also designed to support the battery cells. The at least two battery cells of a battery cell layer are arranged adjacent to one another in at least one direction transverse to the stacking direction.

12 Claims, 3 Drawing Sheets

(51) Int. Cl.
*H01M 10/625* (2014.01)
*H01M 10/647* (2014.01)
*H01M 10/65* (2014.01)
*H01M 10/6556* (2014.01)
*H01M 10/6557* (2014.01)
*H01M 50/207* (2021.01)
*H01M 50/209* (2021.01)
*H01M 50/211* (2021.01)
*H01M 50/249* (2021.01)
*H01M 50/271* (2021.01)

(52) U.S. Cl.
CPC ....... *H01M 10/647* (2015.04); *H01M 50/211* (2021.01); *H01M 50/249* (2021.01); *H01M 50/271* (2021.01); *H01M 2220/20* (2013.01)

(56) References Cited

U.S. PATENT DOCUMENTS

| | | | |
|---|---|---|---|
| 2014/0023894 | A1 | 1/2014 | Jansen et al. |
| 2014/0079968 | A1 | 3/2014 | Schmidt et al. |
| 2015/0072199 | A1 | 3/2015 | Schmidt et al. |
| 2015/0140366 | A1 | 5/2015 | Nicholls |
| 2016/0072165 | A1 | 3/2016 | Abels et al. |
| 2017/0025646 | A1* | 1/2017 | Ota ................... H01M 10/049 |
| 2017/0098873 | A1* | 4/2017 | Tsuchiya ............... H01G 11/54 |
| 2018/0053921 | A1 | 2/2018 | Kim et al. |
| 2018/0366796 | A1 | 12/2018 | Wesche et al. |
| 2019/0372079 | A1 | 12/2019 | Nakamoto et al. |

FOREIGN PATENT DOCUMENTS

| | | |
|---|---|---|
| CN | 103682514 A | 3/2014 |
| CN | 104620406 A | 5/2015 |
| CN | 107017363 A | 8/2017 |
| CN | 107431163 A | 12/2017 |
| CN | 107985049 A | 5/2018 |
| CN | 207559020 U | 6/2018 |
| CN | 108370006 A | 8/2018 |
| DE | 10 2007 063 269 A1 | 6/2009 |
| DE | 10 2010 014 183 A1 | 10/2011 |
| DE | 10 2013 109 808 A1 | 3/2015 |
| DE | 10 2013 016 100 A1 | 4/2015 |
| DE | 11 2015 004 053 T5 | 5/2017 |
| DE | 10 2015 224 920 A1 | 6/2017 |
| DE | 10 2016 215 850 A1 | 3/2018 |
| JP | 2004-227788 A | 8/2004 |
| JP | 2007-42453 A | 2/2007 |
| JP | 2012-124071 A | 6/2012 |
| JP | 2014-22237 A | 2/2014 |
| WO | WO 2018/142476 A1 | 8/2018 |

OTHER PUBLICATIONS

Japanese-language Written Opinion (PCT/ISA/237) issued in PCT Application No. PCT/EP2019/078832 dated Feb. 12, 2020 (three (3) pages).

German-language Search Report issued in German Application No. 10 2018 130 335.1 dated Oct. 14, 2019 with partial English translation (13 pages).

Chinese-language Office Action issued in Chinese Application No. 201980067410.9 dated Nov. 24, 2023 with English translation (22 pages).

Chinese-language Office Action issued in Chinese Application No. 201980067410.9 dated Sep. 9, 2022 with English translation (22 pages).

* cited by examiner

HIGH-VOLTAGE BATTERY COMPRISING A TEMPERATURE CONTROL DEVICE, AND VEHICLE

BACKGROUND AND SUMMARY OF THE INVENTION

The invention relates to a high-voltage battery for an electrically drivable vehicle comprising a plurality of battery cells and at least two temperature control plates for controlling the temperature of the battery cells. The invention further relates to a vehicle.

In the present case interest focuses primarily on rechargeable high-voltage batteries or high-voltage accumulators which may be used as traction batteries for electrically drivable vehicles, for example electric or hybrid vehicles. Such high-voltage batteries have a plurality of battery cells, which take the form, for example, of prismatic battery cells with a rigid, metallic cell housing. The battery cells are generally stacked upright into cell stacks and connected to form battery modules. For the purpose of mechanical stabilization, the cell stacks are in this case conventionally arranged in a cell module frame. The battery modules are then arranged in a battery housing of the high-voltage battery, where they have to be fastened with effort and interconnected via electrical module connectors. The high-voltage battery thus has a plurality of electrical interfaces, for example in the form of the module connectors.

The battery housing is finally connected mechanically with the vehicle body of the vehicle. The battery housing, the cell module frames and the rigid cell housings form a partial load-bearing structure for the high-voltage battery, which gives the high-voltage battery its mechanical strength. However, the battery housing, the cell housings and the cell module frames are heavy, resulting in the disadvantage that the weight of the vehicle is increased and the range of the vehicle thus reduced. Moreover, the high-voltage battery has as a result of the load-bearing structure a plurality of mechanical interfaces, namely for fastening the battery cells in a respective battery module, for fastening the battery modules in the battery housing and for fastening the battery housing to the vehicle body.

It is furthermore known from the prior art to provide the high-voltage battery with a temperature control device, which controls the temperature of the battery cells, i.e. cools or heats them, during operation of the high-voltage battery. The temperature control device may for example have in each case, for each battery module, a temperature control plate through which temperature control fluid flows and which is arranged on one side face of the cell stack of the respective battery module, for example on a bottom of the cell stack formed by housing bases of the cell housings. Owing to this unilateral temperature control of the battery cells, the temperature control performance of the temperature control device is comparatively low. Moreover, the temperature control plates of the battery modules are coupled together fluidically in a complex manner, such that the high-voltage battery has not only the electrical and mechanical interfaces but also a plurality of fluidic interfaces or temperature control interfaces.

The object of the present invention is to provide a particularly weight-saving, mechanically stable and reduced-interface high-voltage battery for an electrically drivable vehicle.

This object is achieved according to the invention by a high-voltage battery and a vehicle having the features according to the respective independent claims. Advantageous embodiments of the invention constitute the subject matter of the dependent patent claims, the description and the figures.

A high-voltage battery according to the invention for an electrically drivable vehicle has a plurality of battery cells and at least two temperature control plates for controlling the temperature of the battery cells. The high-voltage battery has a sandwich structure with at least one layer stack of temperature control plates and battery cells. To form the at least one layer stack, a temperature control plate layer consisting of in each case one temperature control plate and a battery cell layer consisting of in each case at least two battery cells are stacked alternately one above the other in a stack direction. The temperature control plate of a temperature control plate layer is additionally configured to support the battery cells and the at least two battery cells of a battery cell layer are arranged adjacent one another in at least one direction transverse to the stack direction.

The invention further relates to an electrically drivable vehicle, which has a high-voltage battery according to the invention. The vehicle takes the form of an electric or hybrid vehicle and has the high-voltage battery as traction battery.

The high-voltage battery comprises the battery cells, which are configured for example as rechargeable lithium-ion battery cells. To control the temperature of the battery cells when the high-voltage battery is in operation, the high-voltage battery comprises the temperature control plates. The temperature control plates may be coupled with a vehicle temperature control circuit providing a temperature control fluid. To dissipate the heat output by the battery cells, the temperature control fluid may flow through the temperature control plates in the form of a cooling fluid. In this case, the battery cells are cooled and the temperature control plates function as cooling plates. It may also be provided that the battery cells have to be heated. Then the temperature control fluid flowing through the temperature control plates takes the form of a heating fluid and the plates thus function as heating plates.

In this case, in particular each temperature control plate is designed to support or hold at least two battery cells, wherein the battery cells are arranged horizontally, not upright, on the respective temperature control plate. The temperature control plates thus additionally form an auxiliary structure or supporting structure of the high-voltage battery. Due to the horizontal arrangement, each battery cell rests in particular with one of its largest outer faces against at least one temperature control plate, so enabling improved heat dissipation from the battery cells to the temperature control plate. The battery cells are here arranged adjacent one another. For example, the battery cells may be laid next to one another in a first direction oriented transversely of the stack direction. The first direction corresponds for example to a transverse direction of the vehicle. Alternatively or in addition, the battery cells may be laid one behind the other in a second direction oriented transversely of the stack direction and of the first direction. The second direction corresponds for example to a longitudinal direction of the vehicle.

The temperature control plates and the battery cells are in this case stacked one above the other in the stack direction, which corresponds for example to the vertical direction of the vehicle, and thus arranged in a sandwich construction forming the sandwich structure. The resultant at least one layer stack comprises a bottom, which may be formed by a battery cell layer or a temperature control plate layer, a top opposite the bottom in the stack direction, which may be formed by a battery cell layer or a temperature control plate layer, and multiple side faces. The side faces are formed by two side regions, which lie opposite one another in particular in the first direction corresponding to the vehicle transverse direction, and a front and a back, which lie opposite one another in particular in the second direction corresponding to the vehicle longitudinal direction.

This sandwich structure, in which the temperature control plates are also used as an auxiliary structure for holding the battery cells, has high mechanical strength or stability. The battery cells thus no longer have to be arranged in battery modules for the purpose of mechanical stabilization, whereby it is possible to dispense with mechanical interfaces for fastening the battery cells in the battery modules and for fastening the battery modules in a battery housing of the high-voltage battery. Because the battery cells are no longer combined in the modular construction, it is moreover possible to dispense with the module connectors for electrical connection of the battery modules. The sandwich structure has just one electrical interface in the form of main terminals of the high-voltage battery for electrical connection of the high-voltage battery with an electrical prime mover of the vehicle. The high-voltage battery according to the invention thus advantageously has a reduced number of interfaces and a reduced weight while retaining high mechanical stability.

The battery cells are particularly preferably configured as pouch cells. Pouch cells or coffee bag cells do not have any rigid, metallic and thus heavy cell housing to accommodate the cell chemistry of the battery cell, but rather a foil-type envelope or outer foil. The cell chemistry consists in particular of active, stacked or folded layers, which in the case of a pouch cell are enclosed by the foil-type envelope. This results in a flat, bag-like, flexible battery cell which has a particularly low weight due to the outer foil. These pouch cells, which, due to the thin outer foil, are however sensitive to mechanical damage, are placed onto the temperature control plates and arranged jointly with the temperature control plates in the sandwich construction. By arranging, and also compressing and adhesively bonding, the pouch cells between two temperature control plates, they are protected from mechanical damage. By using pouch cells, the weight of the high-voltage battery can be reduced and at the same time high stability may be provided for the high-voltage battery owing to the sandwich construction.

In this case, it may be provided that the temperature control plates of the at least one layer stack are connected mechanically together via at least one connection element. For example, the connection element may be a strip extending in the stack direction, which is arranged on one of the side faces of the cell stack and which is connected, for exampled screwed, to the temperature control plate layers. In this way, the battery cells are clamped between the temperature control plates and are thus held between the temperature control plates. This results in a compact layer stack, which can be mounted as a whole in a battery housing of the high-voltage battery or directly to the vehicle. Alternatively or in addition, the temperature control plate layers and the battery cell layers may be integrally bonded together. For example, the battery cell layers and the temperature control plate layers may be adhesively bonded or encapsulated together. Due to the integrally bonded connection of the layers, the mechanical strength or stability of the sandwich structure is further increased.

The high-voltage battery is preferably configured without a housing for integration of the high-voltage battery into the body of a vehicle. The high-voltage battery, whose mechanical stability is already sufficiently great due to the sandwich structure, thus does not have a separate battery housing. In other words, the high-voltage battery is formed by the sandwich structure. The sandwich structure may, for example, without being arranged in a separate housing, be arranged between an underbody of the vehicle and a passenger cell of the vehicle and fastened there. Thus, mechanical interfaces for fastening the at least one layer stack in a battery housing and for fastening the battery housing to the vehicle body may be dispensed with. Moreover, the weight of the high-voltage battery and thus the weight of the vehicle are additionally reduced by omission of the battery housing. In particular, the high-voltage battery may be form-fittingly connected with the body of the vehicle. For instance, mechanical interfaces for fastening the at least one layer stack to the vehicle body may additionally at least be reduced.

In one further development of the invention, the battery cells are arranged in the battery cell layer in such a way that cell terminals of the battery cells are arranged on at least one side face of the layer stack oriented parallel to the stack direction. The cell terminals, which in the case of pouch cells are configured for example as flag-like terminals, project in particular beyond the temperature control plate layers and thus protrude out between the temperature control plate layers. The cell terminals are hereby accessible at at least one of the side faces of the layer stack and may thus be electrically connected for interconnection of the battery cells. For example, electrical contacts for electrical connection of the cell terminals may be guided along the least one side face. Since the battery cells are no longer arranged in the modular construction, electrical interfaces in the form of module connectors may hereby be dispensed with.

It may then be provided that, in each battery cell layer, at least two battery cells are arranged next to one another in a first direction oriented transversely of the stack direction, wherein the cell terminals of the battery cells arranged next to one another are arranged on one side face of the at least one layer stack. The battery cells may thus be arranged in a row in the first direction, thus for example in the vehicle transverse direction, next to one another on the temperature control plate. The cell terminals of the battery cells arranged next to one another are then accessible at the front or back of the layer stack. Alternatively or in addition, two battery cells may be arranged one behind the other in a second direction oriented transversely of the stack direction, wherein the cell terminals of the battery cells arranged one behind the other are arranged at two side faces, opposite one another in the second direction, of the at least one layer stack. The battery cells may thus be arranged in two rows. For example, at least four battery cells may be arranged per battery cell layer, wherein at least two battery cells are arranged next to one another in each row. The cell terminals of the battery cells in the first row may for example be accessible at the front of the layer stack and the cell terminals of the battery cells in the second row may for example be accessible at the back of the layer stack. In this way, a high number of battery cells, by which vehicle range is defined, may be arranged in the layer stack.

In one embodiment of the invention, the sandwich structure has two cover plates, wherein a first cover plate is arranged on the bottom of the at least one layer stack and a second cover plate is arranged on the top, opposite the bottom in the stack direction, of the at least one layer stack. In particular, the bottom and the top of the layer stack are formed in each case by a battery cell layer, wherein each battery cell layer is covered by a cover plate. In this way, the battery cells of the battery cell layers, which are formed in particular as pouch cells, are protected from damage. Moreover, while adding the least possible weight, the cover plates increase the mechanical stability of the in particular housing-less high-voltage battery and simplify fastening of the high-voltage battery to the body of the vehicle. Multiple layer stacks may also be arranged next to one another and/or behind one another between the cover plates and be fastened to the cover plates. The cover plates may thus hold together multiple layer stacks, such that the high-voltage battery is configured as a compact structural unit in the form of the sandwich structure, which may be arranged for example in just one mounting step on the body of the vehicle.

It may be provided that the sandwich structure has at least two layer stacks, which are arranged next to one another in a first direction transverse to the stack direction, and at least three load-bearing structures, which extend in the stack direction between the cover plates, wherein in each case one layer stack is arranged between two load-bearing structures and the cover plates are connected mechanically with the load-bearing structures. Each layer stack is thus arranged between two laterally arranged load-bearing structures and between cover plates arranged at the top and bottom. The load-bearing structures in this case extend in particular in the stack direction and in the second direction, such that they form dividing walls between the layer stacks. The fronts and backs of the layer stacks, at which in particular the cell terminals are arranged, are exposed. The layer stacks are thus already arranged in a fixed position via the load-bearing structures and the cover plates and therefore do not have to be fastened separately to the body of the vehicle. Instead, the sandwich structure may be fastened as a whole to the body.

The temperature control plates preferably in each case have at least one fluid duct, which conveys a temperature control fluid in a direction of flow transverse to the stack direction. The high-voltage battery has a fluid distributor for introducing the temperature control fluid into the fluid ducts of the temperature control plates and a fluid collector for taking up the temperature control fluid from the fluid ducts of the temperature control plates, which are arranged on opposite side faces of the sandwich structure in the direction of flow and are coupled fluidically and mechanically with the temperature control plates. The fluid distributor and the fluid collector may be coupled to the temperature control circuit of the vehicle which provides the temperature control fluid. They are in particular arranged at the opposite side regions of the at least one layer stack in the vehicle transverse direction, such that the direction of flow here extends along the vehicle transverse direction.

The fluid distributor and the fluid collector are in each case configured in one piece and in each case have a number of fluid terminals corresponding to the number of fluid ducts and coupled fluidically to the fluid ducts. As a result of the one-piece configuration, the fluid distributor and the fluid collector may be arranged particularly simply on the layer stack, wherein all the temperature control plates arranged one above the other in the layer stack are coupled to the temperature control circuit by the fluid distributor and the fluid collector. The high-voltage battery with the at least one layer stack thus has a smaller number of fluidic interfaces than a high-voltage battery of modular construction, said fluidic interfaces moreover being particularly simply contactable. In the case of multiple layer stacks, which are arranged next to one another in the vehicle transverse direction, the fluid distributor and the fluid collector may be fastened to the side regions of the in each case outer layer stack of the sandwich structure. The temperature control fluid is thus passed from the fluid distributor through all the layer stacks to the fluid collector.

The embodiments presented in relation to the high-voltage battery according to the invention and the advantages thereof apply mutatis mutandis for the vehicle according to the invention.

Further features of the invention are revealed by the claims, the figures and the description of the figures. The features and combinations of features stated above in the description and the features and combinations of features stated below in the description of the figures and/or shown solely in the figures are usable not only in the respectively stated combination but also in other combinations or alone.

The invention will now be explained in greater detail on the basis of a preferred exemplary embodiment and with reference to the drawings.

In the figures, elements which are the same or have the same function are provided with the same reference signs.

DETAILED DESCRIPTION OF THE DRAWINGS

Figure 1:
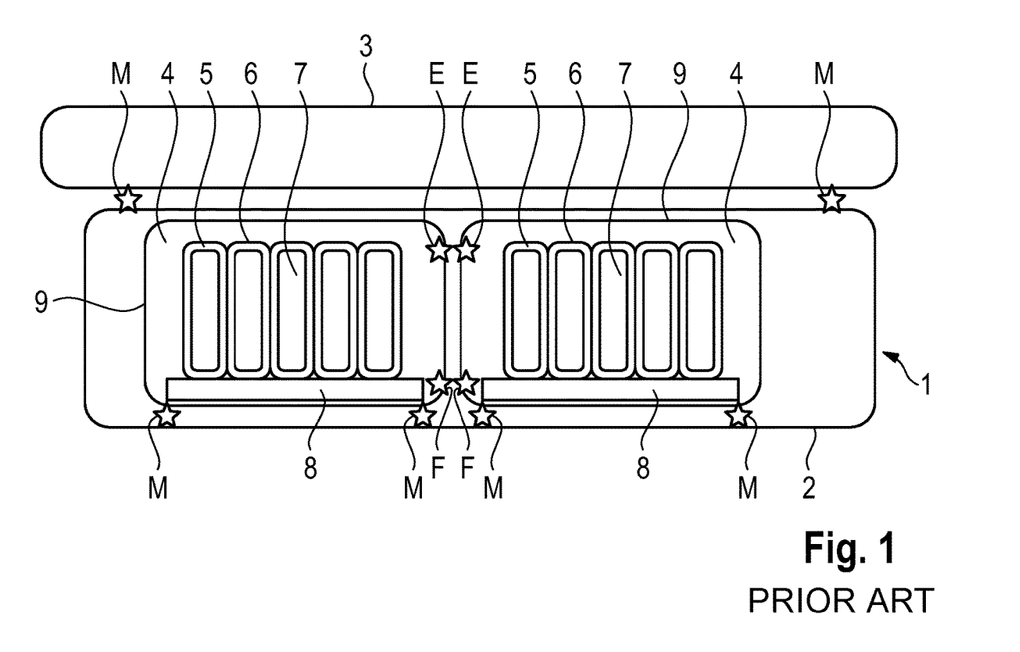
FIG. 1 is a schematic cross-sectional representation of a high-voltage battery according to the prior art arranged on a vehicle.

FIG. 1 shows a high-voltage battery 1 according to the prior art. The high-voltage battery 1, which serves as a traction battery for an electrically drivable vehicle, has a battery housing 2, which is fastened via mechanical interfaces M to a body 3 of the vehicle. Multiple battery modules 4 are arranged in the battery housing 2 which in each case have a plurality of prismatic battery cells 5 stacked to form cell stacks. The battery cells 5 in each case comprise a rigid cell housing 6, which is formed of aluminum, for example, and in which a cell chemistry 7 of the battery cell 5 is arranged. The battery modules 4 are fastened to the battery housing 2 via further mechanical interfaces M of the high-voltage battery 1 and are connected electrically together via electrical interfaces E of the high-voltage battery 1, for example module connectors not shown here.

The battery modules 4 in each case have a temperature control plate 8, which is arranged at a bottom of the cell stack of battery cells 5 and which has fluid ducts for conveying a temperature control fluid along the bottom of the cell stack. The temperature control plate 8 serves in temperature control of the battery cells 5, wherein each battery cell 5 is in contact with the respective temperature control plate 8 over only a small area due to the upright arrangement on the temperature control plate 8. This small area, over which waste heat is transferred from the battery cell 5 to the temperature control plate 8, results in low temperature control performance. The battery modules 4 are coupled together via fluidic interfaces F for passage of the temperature control fluid through the temperature control plates 8. The battery cells 5 and the temperature control plate 8 of a battery module 4 are moreover arranged in a cell module frame 9 and held therein. The per se known high-voltage battery 1 has a high weight due to the battery housing 2, the cell housings 6 and the cell module frames 9, whereby vehicle range is reduced. Moreover, the high-voltage battery 1 has a plurality of interfaces M, E, F, in particular a plurality of mechanical interfaces M, contacting of which requires considerable effort.

Figure 2:
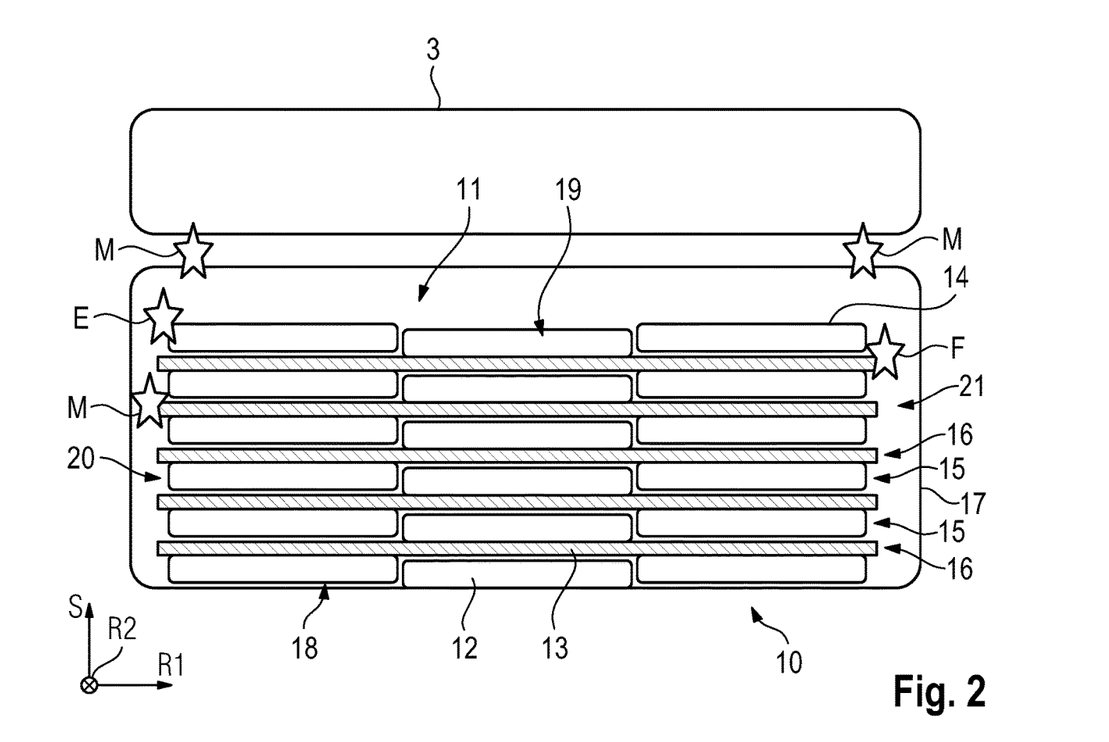
FIG. 2 is a schematic cross-sectional representation of a first embodiment of a high-voltage battery according to the invention.
Figure 3:
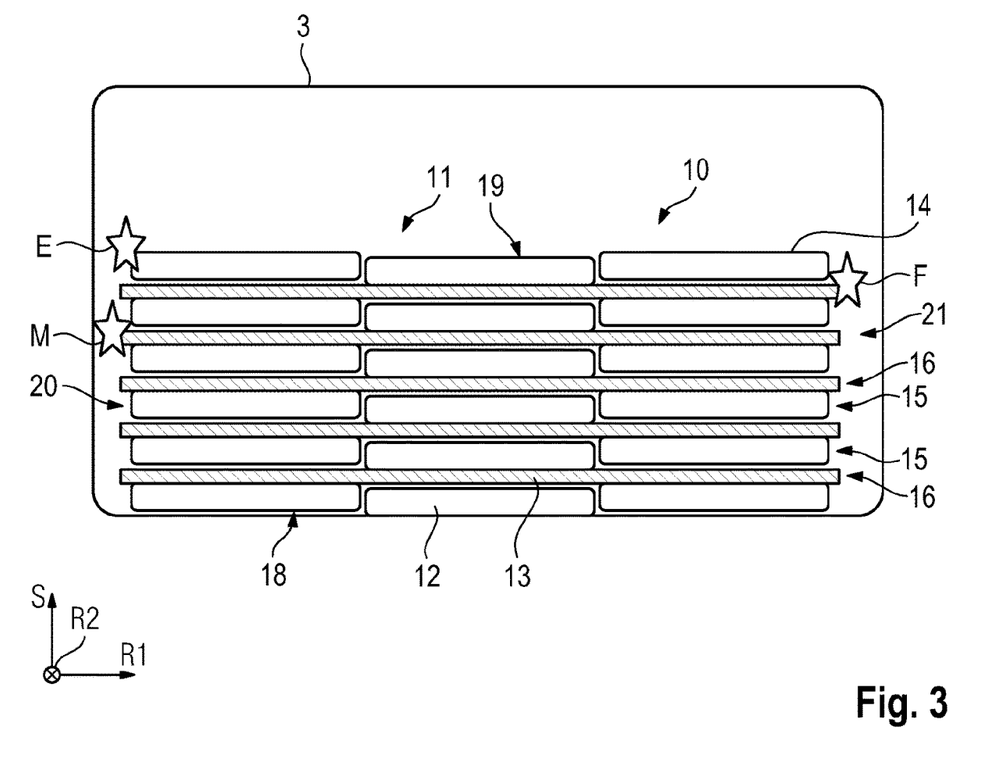
FIG. 3 is a schematic cross-sectional representation of a second embodiment of a high-voltage battery according to the invention.
Figure 4:
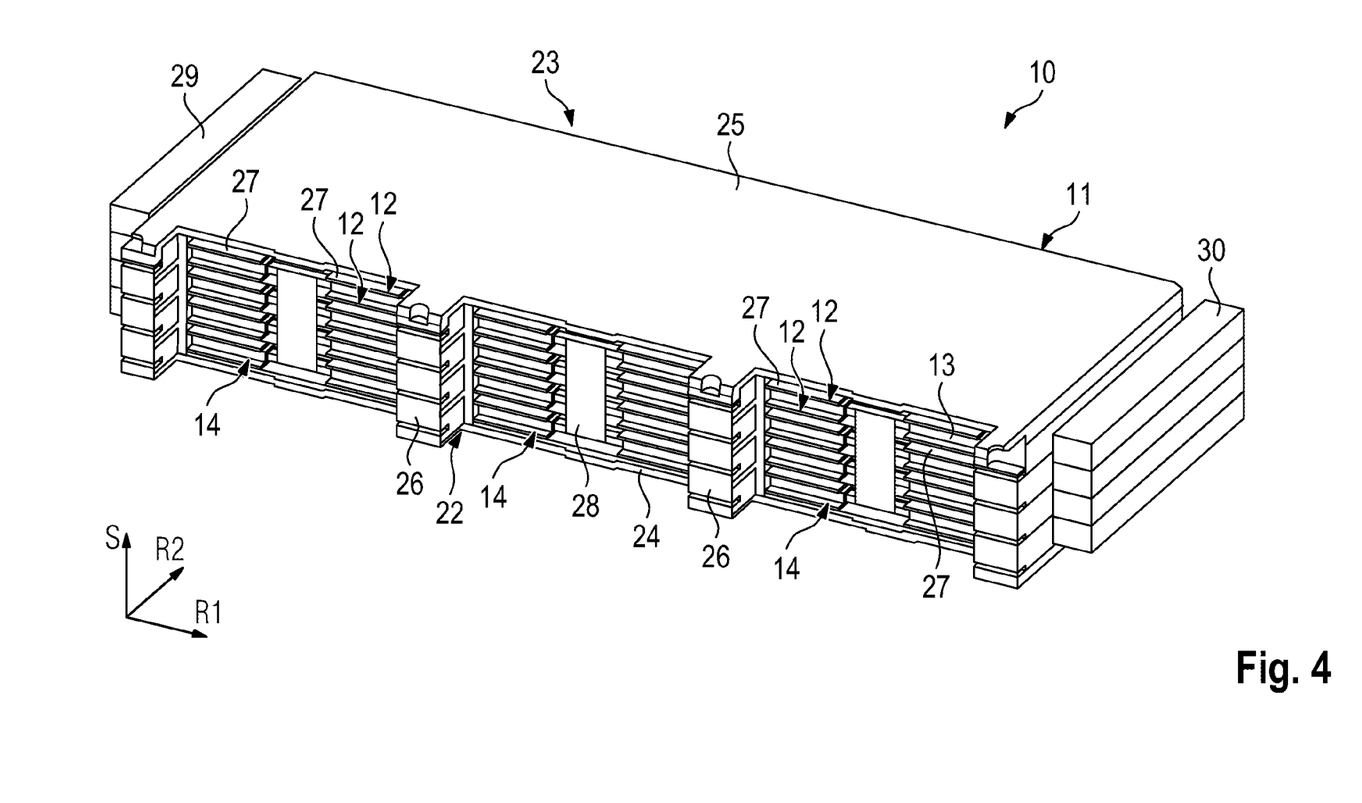
FIG. 4 is a schematic perspective representation of a third embodiment of a high-voltage battery according to the invention.

FIG. 2, FIG. 3 and FIG. 4 show different embodiments of a high-voltage battery 10 for an electrically drivable vehicle. FIG. 2 and FIG. 3 show the high-voltage batteries 10 in a cross-sectional representation and FIG. 4 shows the high-voltage battery 10 in a perspective representation. The high-voltage battery 10 has a sandwich structure 11, which has a plurality of battery cells 12 and a plurality of temperature control plates 13 for controlling the temperature of the battery cells 12. The battery cells 12 are in particular pouch cells and thus do not have a rigid, heavy cell housing. The temperature control plates 13 are configured both for temperature control of the battery cells 12 and as a supporting structure for supporting the battery cells 12. To this end, the temperature control plates 13 and the battery cells 12 are stacked to form at least one layer stack 14, by alternately arranging one battery cell layer 15 and one temperature control plate layer 16 in a stack direction S.

According to the embodiments of the high-voltage battery 10 in FIG. 2 and FIG. 3, the sandwich structure 11 has precisely one layer stack 14, while according to the embodiment of the high-voltage battery 1 in FIG. 4, the sandwich structure 11 has multiple layer stacks 14, which are arranged next to one another in a first direction R1. The stack direction S corresponds to a vertical direction of the vehicle. The first direction corresponds to a transverse direction of the vehicle. Each temperature control plate layer 16 consists of precisely one temperature control plate 13 and each battery cell layer 15 consists of at least two battery cells 12. The battery cells 12 are here no longer combined to form modules.

The battery cells 12 of a battery cell layer 15 are arranged horizontally and adjacent one another on the temperature control plate layers 16. Through the horizontal arrangement of the battery cell 12 on the temperature control plate 13, the area over which waste heat is transferred from the battery cell 12 to the temperature control plate 13 is enlarged and thus heat dissipation is increased. Here, in one battery cell layer 15, multiple battery cells 12 are arranged next to one another in a row in the first direction R1 oriented transversely of the stack direction S. It may however also be the case that further battery cells 12 are additionally provided in a battery cell layer 15 which are arranged in a further row behind the battery cells 12 shown here, in a second direction R2 (into the plane of the drawing) oriented transversely of stack direction S and transversely of the first direction R1. The second direction R2 corresponds to a longitudinal direction of the vehicle. The battery cell layers 15 and the temperature control plate layers 16 of a layer stack 14 may for example be integrally bonded, such that the layer stack 14 is configured as a compact structural unit.

According to FIG. 2, the sandwich structure 11 is arranged in a battery housing 17 which is mechanically connected with the body 3 of the vehicle. Since the high-voltage battery 1 does not have any battery modules but rather just the sandwich structure 11, only this has to be fastened in the battery housing 17, so reducing the number of mechanical interfaces M of the high-voltage battery 1. In FIG. 3 the high-voltage battery 10 is configured without a housing. The sandwich structure 11 is integrated directly into the body 3 of the vehicle, such that the number of mechanical interfaces M of the high-voltage battery 10 is minimized.

The layer stack 14 has a bottom 18, a top 19 opposite the bottom 18 in the stack direction S and multiple side faces oriented parallel to the stack direction S. The side faces are two opposing side regions 20, 21 in the first direction R1 and a front 22 (see FIG. 4) and a back 23 (see FIG. 4) which are opposite one another in the second direction R2. The bottom 18 and the top 19 are here formed in each case by one battery cell layer 15. In the embodiment of the high-voltage battery 10 according to FIG. 4, the sandwich structure 11 has two cover plates 24, 25, wherein the cover plate 24 is arranged on the bottoms 18 of the layer stacks 14 and the cover plate 25 on the tops 19 of the layer stacks 14. Between the layer stacks 14 and adjacent the side regions 20, 21 of the outer two layer stacks 14 load-bearing structures 26 are arranged, which are mechanically connected, for example screwed, to the cover plates 24, 25. The layer stacks 14 are held and fixed in a given position by the cover plates 24, 25. Moreover, the battery cells 12 in the form of the housing-less pouch cells are protected by the cover plates 24, 25.

The battery cells 12 are placed in such a way on the temperature control plates 13 that cell terminals 27, which in the case of pouch cells are configured as flag-type terminals, are accessible at one of the side faces of the layer stacks 14, here at the fronts 22 of the layer stacks 14. In this way, the cell terminals 27 can be electrically contacted at this side face. This also reduces the number of electrical interfaces E. The electrical interfaces E shown in FIG. 2 and FIG. 3 serve as main terminals of the high-voltage battery 10 for electrical connection of the high-voltage battery 10 with an inverter, which is in turn connected with an electrical prime mover of the vehicle. Moreover, the temperature control plates 13 of a layer stack 14 are here connected together mechanically. To this end, the temperature control plates 13 are here screwed at the front 22 of the layer stack 14 to a connection element 28, for example a strip.

The temperature control plates 13 in each case have at least one fluid duct, which here extends in the first direction R1 and may convey a temperature control fluid along the battery cell layers 15. All the fluid ducts of the temperature control plates 13 stacked one above the other are accessible at the side regions 20, 21 of the layer stacks 14. To introduce the temperature control fluid into the fluid ducts, according to FIG. 4 a fluid distributor 29 coupled fluidically to all the temperature control plates 13 may be arranged at the side region 20 of the left-hand layer stack 14 of the sandwich structure 11. At the side region 21 of the right-hand layer stack 14, a fluid collector 30 is arranged, which is coupled fluidically to the temperature control plates 13 and which takes up again the temperature control fluid passed through the fluid ducts. The temperature control plates 13 of the layer stacks 14 are likewise fluidically coupled. The fluid distributor 29 and the fluid collector 30 are configured in one piece, such that the fluid distributor 29 and the fluid collector 30 in each case form a fluidic interface F.

LIST OF REFERENCE SIGNS

1 High-voltage battery
2 Battery housing
3 Vehicle body
4 Battery module
5 Battery cell
6 Cell housing
7 Cell chemistry
8 Temperature control plate
9 Cell module frame
10 High-voltage battery 11 Sandwich structure
12 Battery cells
13 Temperature control plates
14 Layer stack
15 Battery cell layer
16 Temperature control plate layer
17 Battery housing
18 Bottom
19 Top
20, 21 Side regions
22 Front
23 Back
24, 25 Cover plates
26 Load-bearing structures
27 Cell terminals
28 Connection element
29 Fluid distributor
30 Fluid collector
M Mechanical interface
E Electrical interface
F Fluidic interface
S Stack direction
R1, R2 Directions

What is claimed is:

1. A high-voltage battery for an electrically drivable vehicle, comprising:
    a plurality of battery cells; and
    at least two temperature control plates for controlling the temperature of the battery cells, comprising at least a first temperature control plate and a second temperature control plate, wherein
    the high-voltage battery has a sandwich structure with at least one layer stack, wherein the at least one layer stack comprises, stacked alternately one above the other in order in a stack direction:
        a first battery cell layer comprising at least two battery cells;
        a first temperature control plate layer comprising the first temperature control plate;
        a second battery cell layer comprising at least two other battery cells; and
        a second temperature control plate layer comprising the second temperature control plate;
    the first temperature control plate of the first temperature control plate layer is configured to support the at least two battery cells of the first battery cell layer, and the second temperature control plate of the second temperature control plate layer is configured to support the at least two other battery cells of the second battery cell layer,
    the at least two battery cells of the first battery cell layer are arranged adjacent one another in at least one direction transverse to the stack direction, and the at least two other battery cells of the second battery cell layer are arranged adjacent one another in the at least one direction transverse to the stack direction,
    wherein the plurality of battery cells are flexible pouch cells,
    wherein the plurality of battery cells have a top surface and a bottom surface that are orthogonal to the stack direction, and a plurality of side surfaces, wherein the top surface and the bottom surface each have a surface area larger than any of the plurality of side surfaces, and
    wherein the bottom surfaces of the at least two battery cells of the first battery cell layer contact the first temperature control plate, the top surfaces of the at least two other battery cells of the second battery cell layer contact the first temperature control plate, and the bottom surfaces of the at least two other battery cells of the second battery cell layer contact the second temperature control plate.

2. The high-voltage battery according to claim 1, further comprising:
    at least one connection element of the sandwich structure, wherein the first and second temperature control plate layers of the at least one layer stack are connected mechanically together via the at least one connection element of the sandwich structure.

3. The high-voltage battery according to claim 1, wherein the first temperature control plate layer and the first battery cell layer are integrally bonded together, and the second temperature control plate layer and the second battery cell layer are integrally bonded together.

4. The high-voltage battery according to claim 1, wherein the high-voltage battery is configured without a housing for integration of the high-voltage battery into a body of the vehicle.

5. The high-voltage battery according to claim 1, wherein the battery cells of at least the first battery cell layer are arranged such that cell terminals of the battery cells are arranged on at least one side face of the at least one layer stack oriented parallel to the stack direction.

6. The high-voltage battery according to claim 5, wherein at least one of:
    (i) in each of the first and second battery cell layer, the at least two battery cells are arranged next to one another in a first direction oriented transversely of the stack direction, wherein the cell terminals of the battery cells arranged next to one another are arranged on one side face of the at least one layer stack, and/or
    (ii) in each of the first and second battery cell layer, two battery cells are arranged one behind the other in a second direction oriented transversely of the stack direction, wherein the cell terminals of the two battery cells arranged one behind the other are arranged at two side faces, opposite one another in the second direction, of the at least one layer stack.

7. The high-voltage battery according to claim 1, further comprising at least one of:
    a third battery cell layer;
    a third temperature control plate layer; or
    a fourth temperature control plate layer,
    wherein
    the sandwich structure has two cover plates,
    a first cover plate is arranged on a bottom of the at least one layer stack, wherein the bottom of the at least one layer stack is formed by the third battery cell layer, the second temperature control plate layer, or the third temperature control plate layer of the at least one layer stack, and
    a second cover plate is arranged on a top of the at least one layer stack opposite the bottom in the stack direction, wherein the top of the at least one layer stack is formed by the first battery cell layer or the fourth temperature control plate layer of the at least one layer stack.

8. The high-voltage battery according to claim 7, further comprising:
    at least a second layer stack arranged next to the at least one layer stack in a first direction transverse to the stack direction; and
    at least three load-bearing structures, which extend in the stack direction between the cover plates,
    wherein the at least one layer stack is arranged between two of the three load-bearing structures, and wherein the second layer stack is arranged between two of the three load-bearing structures, and the cover plates are connected mechanically with the at least three load-bearing structures.

9. The high-voltage battery according to claim 1, wherein the first and second temperature control plates each further comprises at least one fluid duct, which conveys a temperature control fluid in a direction of flow transverse to the stack direction, and wherein the high-voltage battery further comprises:
- a fluid distributor for introducing the temperature control fluid into the fluid ducts of the first and second temperature control plates; and
- a fluid collector for taking up the temperature control fluid from the fluid ducts of the first and second temperature control plates,
- wherein the fluid distributor and the fluid collector are arranged on opposite side faces of the sandwich structure in the direction of flow and are coupled fluidically and mechanically with the first and second temperature control plates.

10. A vehicle comprising the high-voltage battery according to claim 1.

11. The high-voltage battery according to claim 1,
wherein the at least two other battery cells of the second battery cell layer are compressed between the first temperature control plate and the second temperature control plate.

12. The high-voltage battery according to claim 2,
wherein the at least one connection element of the sandwich structure is in a form of a strip extending in the stacking direction and is screwed to the first and second temperature control plates.

\* \* \* \* \*